United States Patent
Kim (10) Patent No.: US 8,916,287 B2
(45) Date of Patent: Dec. 23, 2014

(54) RECHARGEABLE BATTERY

(75) Inventor: Sung-Bae Kim, Yongin-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 0 days.

(21) Appl. No.: 12/965,739

(22) Filed: Dec. 10, 2010

(65) Prior Publication Data

US 2011/0244310 A1    Oct. 6, 2011

Related U.S. Application Data

(60) Provisional application No. 61/374,059, filed on Aug. 16, 2010.

(51) Int. Cl.
| | | |
|---|---|---|
| *H01M 2/02* | (2006.01) | |
| *H01M 6/42* | (2006.01) | |
| *H01M 2/06* | (2006.01) | |
| *H01M 2/20* | (2006.01) | |
| *H01M 2/30* | (2006.01) | |
| *H01M 10/04* | (2006.01) | |
| *H01M 2/04* | (2006.01) | |

(52) U.S. Cl.
CPC ............. *H01M 2/0212* (2013.01); *H01M 6/42* (2013.01); *H01M 2/06* (2013.01); *H01M 2/206* (2013.01); *H01M 2/305* (2013.01); *H01M 10/0413* (2013.01); *H01M 2/0426* (2013.01)
USPC ......................................................... 429/178

(58) Field of Classification Search
None
See application file for complete search history.

(56) References Cited

U.S. PATENT DOCUMENTS

| | | | |
|---|---|---|---|
| 6,156,452 A | 12/2000 | Kozuki et al. | |
| 7,910,239 B2 | 3/2011 | Kim et al. | |
| 2010/0143786 A1 | 6/2010 | Kim | |

FOREIGN PATENT DOCUMENTS

| | | |
|---|---|---|
| CN | 1241303 A | 1/2000 |
| JP | 11-195434 | 7/1999 |
| JP | 2001-357834 | 12/2001 |
| JP | 2002-260631 | 9/2002 |
| JP | 2004-235135 | 8/2004 |
| JP | 2008-097903 | 4/2008 |
| JP | 2009-259424 | 11/2009 |
| JP | 2010-033919 | 2/2010 |
| JP | 2010-055786 | 3/2010 |
| JP | 2010-092697 | 4/2010 |

OTHER PUBLICATIONS

European Search Report dated Aug. 1, 2011, for corresponding European Patent application 11162791.5, noting listed references in this IDS, 5 pages.

(Continued)

*Primary Examiner* — Ula C. Ruddock
*Assistant Examiner* — Daniel Gatewood
(74) *Attorney, Agent, or Firm* — Christie, Parker & Hale, LLP (57) ABSTRACT

A rechargeable battery includes an electrode assembly including a positive electrode, a negative electrode, and a separator therebetween; a case that has an opening that houses the electrode assembly; a cap assembly including a cap plate that covers the opening of the case; and an electrode terminal that is electrically connected to the electrode assembly and protrudes through the cap plate to the outside of the case. The electrode terminal includes a lower terminal plate that is connected to the electrode assembly, an upper terminal plate that covers an upper part of the lower terminal plate, and a terminal fastener that is housed in a space between the lower terminal plate and the upper terminal plate that protrudes through an upper surface of the upper terminal plate.

14 Claims, 9 Drawing Sheets

(56) References Cited

OTHER PUBLICATIONS

Patent Abstracts of Japan, and English machine translation of Japanese Publication 2001-357834, listed above, 15 pages.

Patent Abstracts of Japan, and English machine translation of Japanese Publication 2008-097903, listed above, 11 pages.

Patent Abstracts of Japan, and English machine translation of Japanese Publication 2009-259424, listed above, 37 pages.

JPO Office action dated Apr. 16, 2013, for corresponding Japanese Patent application 2011-085288, (2 pages).

Patent Abstracts of Japan, and English machine translation of Japanese Publication 2010-092697 dated Apr. 22, 2010, listed above, (16 pages).

SIPO Office action dated Oct. 11, 2013, with English translation, for corresponding Chinese Patent application 201110215204.3, (17 pages).

SIPO Office action dated Mar. 21, 2014, with English translation, for corresponding Chinese Patent application 201110215204.3, (11 pages).

SIPO Office action dated Jul. 1, 2014, with English translation, for corresponding Chinese Patent application 201110215204.3, noting listed reference in this IDS (16 pages).

RECHARGEABLE BATTERY

CROSS-REFERENCE TO RELATED APPLICATION

This application claims priority to and the benefit of U.S. Provisional Application No. 61/374,059 filed on Aug. 16, 2010, in the United States Patent and Trademark Office, the disclosure of which is incorporated herein in its entirety by reference.

BACKGROUND

1. Field

The present invention relates to a rechargeable battery.

2. Description of the Related Art

Unlike a primary battery, a rechargeable battery is designed to be recharged by a charging process that changes external electric energy to a chemical energy form and stores the chemical energy and discharged by a discharging process that changes the chemical energy to an electric energy form for use of the electric energy.

Representative examples of a rechargeable battery include a nickel hydrogen battery, a nickel cadmium battery, a lithium ion battery, and a lithium polymer battery.

In general, a rechargeable battery includes an electrode assembly including a positive electrode, a negative electrode, and a separator; a case that houses the electrode assembly; and an electrode terminal that is electrically connected to the electrode assembly and functions as an electrical passage to the exterior of the case. By forming a large capacity battery module by connecting a plurality of rechargeable batteries, the battery module can be used by appliances requiring a large amount of electric power, such as an electric vehicle or a hybrid electric vehicle. In this way, when using a rechargeable battery in an electric vehicle or a hybrid electric vehicle, it is customary to form an electrode terminal using aluminum, copper, etc., in consideration of electrical conductivity and electrochemical corrosion. Additionally, customarily, due to these considerations, the size of the electrode terminal is limited to a predetermined size.

In order to form a battery module from rechargeable batteries, electrode terminals of adjacent rechargeable batteries are connected using a bus bar. When the electrode terminals are formed with aluminum or copper, when fastening the bus bar and the electrode terminals, the bus bar and the electrode terminals cannot be fastened with large torque as a result of the low strength of the electrode terminals.

Thereby, in an environment having much vibration and impact, such as in an electric vehicle or a hybrid electric vehicle, when rechargeable batteries are formed into a battery module, the connection between the bus bar and the electrode terminals (that are fastened with low torque) may be released, causing structural instability of the battery module.

The above information disclosed in this Background section is only for enhancement of understanding of the background of the invention and therefore it may contain information that does not form the prior art that is already known in this country to a person of ordinary skill in the art.

SUMMARY

An aspect of an embodiment of the present invention is directed to a rechargeable battery having an improved electrode terminal structure allowing for an increased fastening force when attaching the electrode terminal to a bus bar when forming a battery module. The increased fastening force reduces failures due to external vibration and impact. Additionally, the increased fastening force increases contact area between the bus bar and the electrode terminal, reducing contact resistance.

An aspect of an embodiment of the present invention is directed to a rechargeable battery including an electrode assembly including a positive electrode, a negative electrode, and a separator that is interposed therebetween; a case that has an opening at one side to house the electrode assembly; a cap assembly including a cap plate that covers the opening of the case; and an electrode terminal that is electrically connected to the electrode assembly and that protrudes outside of the case by penetrating through the cap plate. The electrode terminal includes a first terminal plate that is connected to the electrode assembly, a second terminal plate that covers a part of the first terminal plate, and a terminal fastener that is between the first terminal plate and the second terminal plate and that protrudes through the second terminal plate. The fastening portion of the terminal fastener may be threaded.

The terminal fastener may be made of a first material different from a second material of the first and second terminal plates, the first material having a greater strength than the second material. The first material may have a lower electrical conductivity than the second material. The first material may be stainless steel, and the second material may be aluminum or copper.

The rechargeable battery may include a terminal connection member extending from an inside of the case to an outside of the case through an opening in the cap plate. The terminal connection member may electrically couple the first terminal plate to the electrode assembly and fix the first terminal plate to the cap plate. The electrode terminal may further include a connection plate between the cap plate and the first terminal plate, the terminal connection member protruding through an opening in the connection plate and an opening in the first terminal plate. The connection plate may electrically connect the first terminal plate to the cap plate. The battery may also include a gasket between the first terminal plate and the cap plate to electrically isolate the first terminal plate from the cap plate.

The first terminal plate of the rechargeable battery may include a base plate and at least two side walls protruding therefrom to hold the terminal fastener between the at least two side walls. The base plate may have notches, and the terminal fastener may have protrusions that engage the notches. The at least two side walls may include four side walls formed along a periphery of the base plate. Each of the at least two side walls of the first terminal plate may have a groove at an end distal from the base plate, and the second terminal plate may include protrusions at sides for engaging the grooves. The second terminal plate may be welded to the at least two side walls of the first terminal plate.

The electrode assembly may include a first electrode, a second electrode, and a separator between the first and second electrodes. The first electrode may be electrically coupled to the cap plate. The rechargeable battery may further include a second electrode terminal electrically coupled to the second electrode and electrically isolated from the cap plate.

Another aspect of an embodiment of the present invention is directed to the battery module including a plurality of rechargeable batteries, each including a case; an electrode assembly in the case; a cap plate covering an opening of the case; an electrode terminal; and a bus bar electrically coupling the electrode terminal of a first one of the batteries to the electrode terminal of a second one of the batteries. The electrode terminal includes a first terminal plate on the cap plate and electrically coupled to the electrode assembly; a second terminal plate electrically coupled to the electrode assembly via the first terminal plate, the second terminal plate having an opening therethrough; and a terminal fastener located between the first and second terminal plates and comprising a fastening portion protruding through the opening in the second terminal plate.

The bus bar may be fixed to the second terminal plate of each of the first and second ones of the batteries via a bus bar fastening member.

The fastening portion may be threaded, and the bus bar fastening member may include a nut engaging the threaded fastening portion.

Another aspect of an embodiment of the present invention is directed to an electrode terminal assembly for a rechargeable battery, the electrode terminal assembly including a first terminal plate configured to be electrically coupled to an electrode assembly of the rechargeable battery; a second terminal plate configured to be electrically coupled to the electrode assembly via the first terminal plate, the second terminal plate having an opening therethrough; and a terminal fastener located between the first and second terminal plates and comprising a fastening portion protruding through the opening in the second terminal plate.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Hereinafter, exemplary embodiments of the present invention will be described in detail with reference to the accompanying drawings such that those having ordinary skill in the art to which the present invention pertains may implement the technological concept of the present invention. However, the present invention may be implemented in various different ways, and is not limited to the following exemplary embodiments. Like reference numerals designate like constituent elements throughout the specification.

Throughout this specification and the claims that follow, when it is described that an element is "coupled" to another element, the element may be "directly coupled" to the other element, or it may be "electrically coupled" to the other element through a third element.

Figure 1:
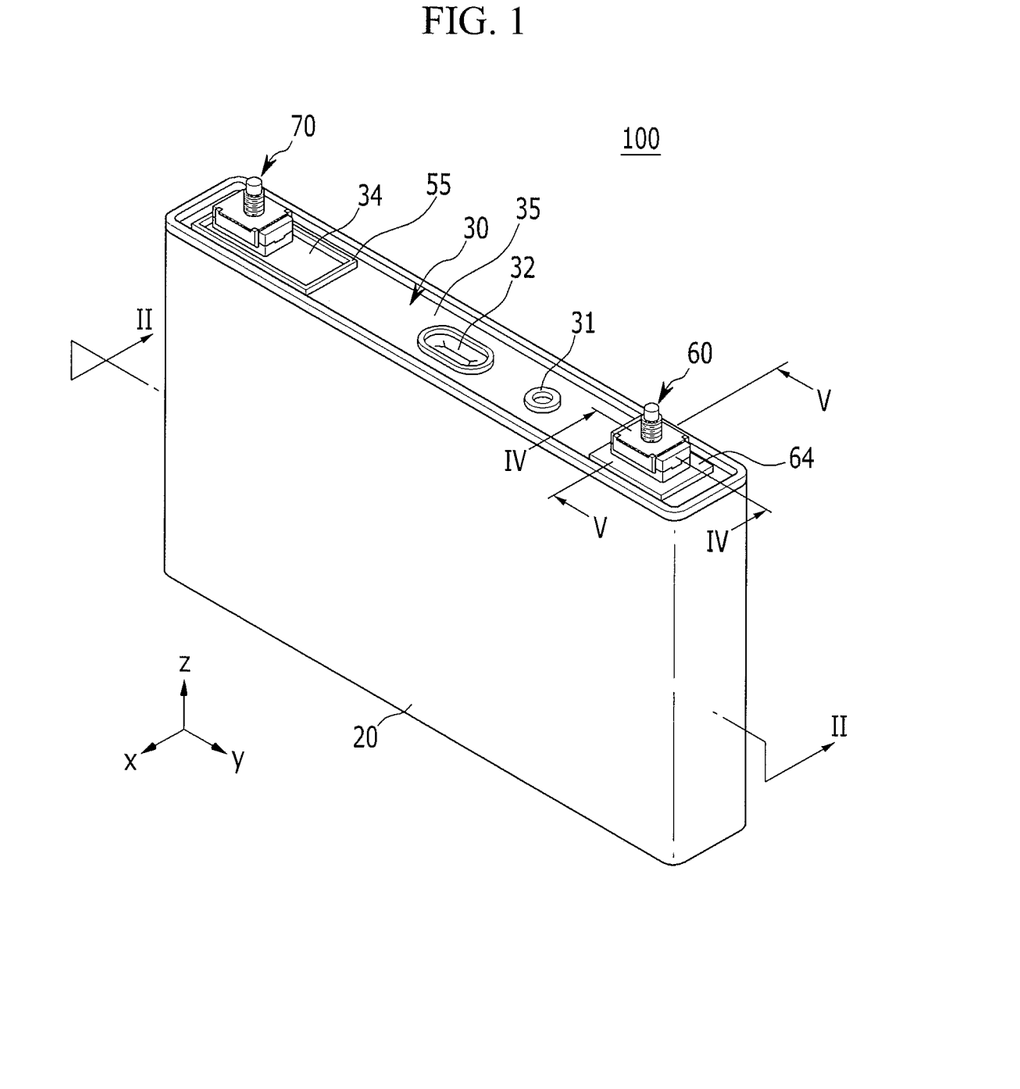
FIG. 1 is a perspective view illustrating a rechargeable battery according to a first exemplary embodiment of the present invention.
Figure 2:
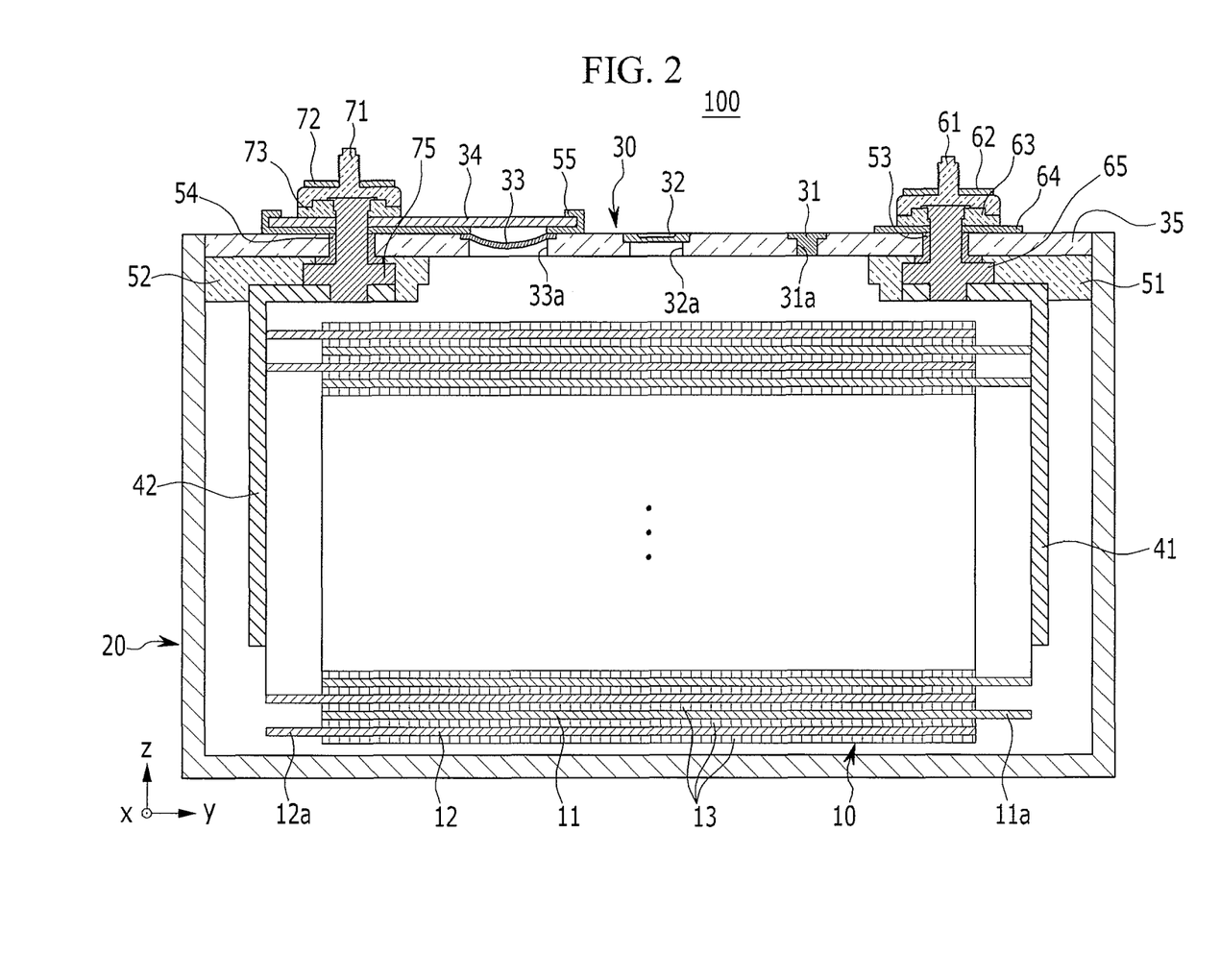
FIG. 2 is a cross-sectional view of the rechargeable battery taken along line II-II of FIG. 1.

FIG. 1 is a perspective view illustrating a rechargeable battery according to a first exemplary embodiment of the present invention, and FIG. 2 is a cross-sectional view of the rechargeable battery taken along line II-II of FIG. 1.

Referring to FIGS. 1 and 2, a rechargeable battery 100 according to the present exemplary embodiment includes an electrode assembly 10, a case 20 that houses the electrode assembly 10, and a cap assembly 30 that covers an opening of the case 20.

The electrode assembly 10 includes a positive electrode 11, a negative electrode 12, and a separator 13. The separator 13 is an insulator that is interposed between the positive electrode 11 and the negative electrode 12. The electrode assembly 10 is formed in a jelly-roll shape by winding together the positive electrode 11, the negative electrode 12, and the separator 13. However, the electrode assembly 10 is not limited thereto and may be formed in a stack structure in which multiple positive electrodes, separators, and negative electrodes that are formed as sheets are stacked.

The positive electrode 11 and the negative electrode 12 include coated portions, which are areas where an active material is coated on thin plates that function as current collectors, and uncoated portions 11a and 12a, which are areas where an active material is not coated. The uncoated portion 11a of the positive electrode 11 is formed at one side end of the positive electrode 11 along a length direction (y-axis direction) of the positive electrode 11, and the uncoated portion 12a of the negative electrode 12 is formed at the other side end of the negative electrode 12 along a length direction (y-axis direction) of the negative electrode 12.

The case 20 is formed in an approximately rectangular parallelepiped shape having an open center (i.e., internal space), the internal space being a space that houses the electrode assembly 10. The case 20 also has an opening at one side of the case 20.

The cap assembly 30 includes a cap plate 35 that is a thin plate adapted to cover the opening. The cap plate 35 includes an electrolyte solution injection port 31 adapted to allow the injection of an electrolyte solution to the internal space of the case 20, and a vent hole 32a for discharging gas generated within the case 20. The cap assembly 30 includes a seal stopper 31 and a vent plate 32. The seal stopper 31 is installed in an electrolyte solution injection port 31a to seal the port. The vent plate 32 is installed in the vent hole 32a and is adapted to be opened to discharge gas when excess pressure and/or temperature is generated within the battery. For instance, the vent plate 32 may be a notch that is broken open when the internal pressure of the rechargeable battery 100 rises to a predetermined (or set) pressure. The cap assembly 30 according to the present exemplary embodiment also includes a deformable plate 33 and a short circuit tab 34 for short circuiting the battery, thus reducing the risk of explosion or ignition due to the increase of internal pressure of the rechargeable battery 100.

Electrode terminals 60 and 70 penetrate through the cap plate 35, and are electrically connected to the electrode assembly 10 to form an electrical passage between the electrode assembly 10 and the outside of the battery. In the present exemplary embodiment, the positive terminal 60 includes an upper terminal plate 62 (e.g., a second terminal plate), a lower terminal plate 63 (e.g., a first terminal plate), a positive terminal connection member 65, and a positive terminal fastener 61, and the negative terminal 70 includes an upper terminal plate 72, a lower terminal plate 73, a negative terminal connection member 75, and a negative terminal fastener 71.

The positive uncoated portion 11a and the negative uncoated portion 12a of the electrode assembly 10 are connected to a positive lead tab 41 and a negative lead tab 42, respectively. The positive lead tab 41 and the negative lead tab 42 are connected to the positive terminal 60 and the negative terminal 70, respectively. The positive terminal connection member 65 penetrates through the cap plate 35 to connect the positive lead tab 41 and the lower terminal plate 63 of the positive terminal 60. The negative terminal connection member 75 penetrates through the cap plate 35 to connect the negative lead tab 42 and the lower terminal plate 73 of the negative terminal 70. The lower terminal plate 63 of the positive terminal 60 is connected to the upper terminal plate 62 of the positive terminal 60. The lower terminal plate 73 of the negative terminal 70 is connected to the upper terminal plate 72 of the negative terminal 70. The electrode terminals 60 and 70 are described in more detail below.

Lower insulation members 51 and 52 are provided to insulate the terminal connection members 65 and 75 and the lead tabs 41 and 42 that are connected to the electrode assembly 10 from the case 20 and the cap plate 35. The lower insulation members 51 and 52 are between the positive and negative lead tabs 41 and 42 and the cap plate 35, and a periphery of the positive and negative lead tabs 41 and 42 are in contact with, or optionally, partially embedded in, the lower insulation members 51 and 52. Further, a periphery of the positive and negative terminal connection members 65 and 75 are in contact with, or optionally, partially embedded in, the lower insulation members 51 and 52. With such a configuration, the lead tabs 41 and 42 and the terminal connection members 65 and 75 may be supported by the insulation members 51 and 52 and a connection between respective lead tabs 41 and 42 and terminal connection members 65 and 75 may be secure, and additionally, the lead tabs 41 and 42 and the terminal connection members 65 and 75 may be insulated from the case 20 and the cap plate 35.

Gaskets 53 and 54 are installed between the cap plate 35 and respective positive and negative terminal connection members 65 and 75 and seal the space between respective positive and negative terminal connection members 65 and 75 and the cap plate 35. The gaskets 53 and 54 may be formed of an insulating material and thus may electrically insulate each of the positive and negative terminal connection members 65 and 75 from the cap plate 35.

At the positive terminal 60 side, a connection plate 64 is installed between the lower terminal plate 63 and the cap plate 35. A through hole (e.g., hole) is in the connection plate 64, the positive terminal connection member 65 extends through the hole and is connected to the lower terminal plate 63, and a top of the positive terminal connection member 65 has a rivet shape, allowing it to be coupled as a rivet to the lower terminal plate 63. While a rivet shape is depicted and described, any suitable apparatus and/or method may be used to couple these components. The connection plate 64 may be made of a material having good electrical conductivity such as aluminum or copper. The connection plate 64 closely contacts the cap plate 35, electrically connecting the positive terminal 60 and the cap plate 35.

As described above, the cap assembly 30 according to the present exemplary embodiment includes a deformable plate 33 and a short circuit tab 34. The deformable plate 33 is installed in a short circuit hole 33a that is formed in the cap plate 35. The deformable plate 33 is electrically connected to the cap plate 35 (which is electrically connected to the positive terminal 60. The short circuit tab 34 covers the short circuit hole 33a, and is electrically connected to the negative terminal 70. An upper insulation member 55 is between the short circuit tab 34 and the cap plate 35 to electrically insulate the short circuit tab 34 from the cap plate 35.

The deformable plate 33 bends toward the internal space of the case 20 during normal operation of the battery. However, if the internal pressure of the rechargeable battery 100 rises (e.g., due to overcharging) above a set pressure, the deformable plate 33 is deformed toward the outside of the battery, and electrically contacts the short circuit tab 34. Therefore, when the internal pressure rises above a set pressure, the deformable plate 33 and the short circuit tab 34 are electrically connected to each other, causing a short circuit, thereby preventing or reducing explosion and/or ignition of the rechargeable battery 100 due to the increase of internal pressure. The deformable plate 33 has sufficient thickness to sustain a short circuit state despite the heat that is generated upon short-circuiting.

Hereinafter, the structure of an electrode terminal of a rechargeable battery according to a first exemplary embodiment of the present invention will be described in detail with reference to FIGS. 3 to 5.

Figure 3:
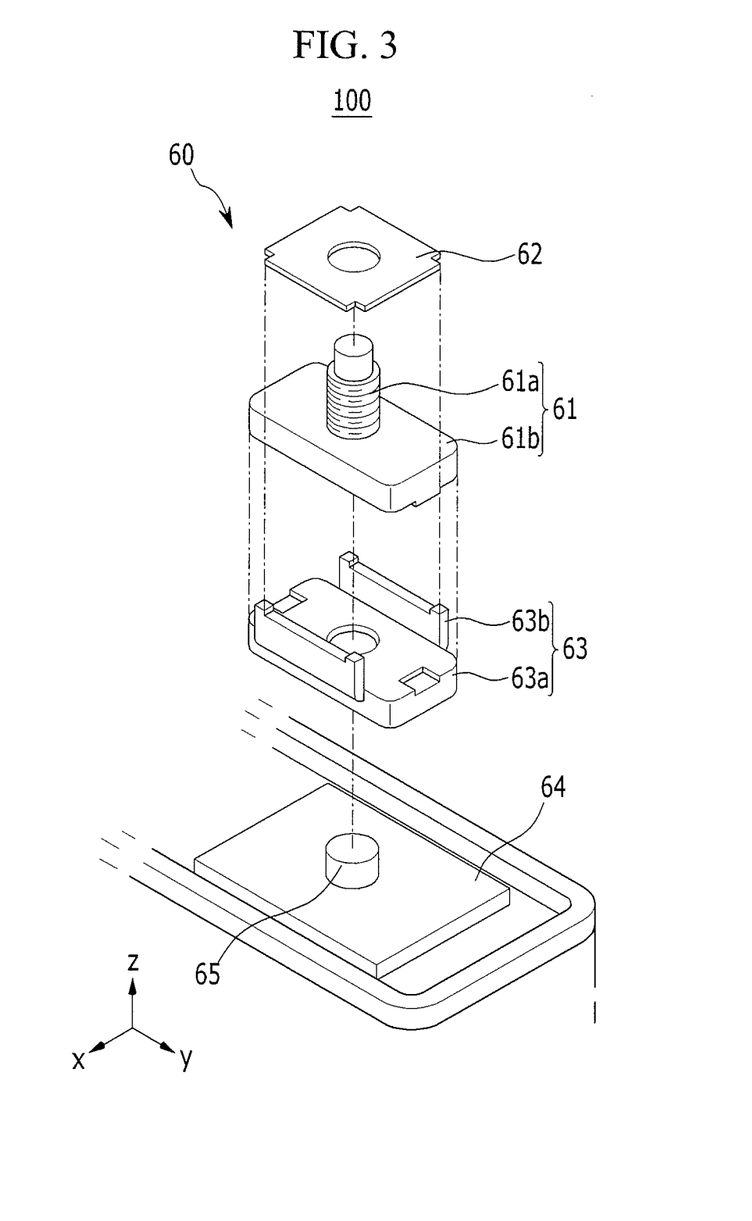
FIG. 3 is a partial exploded perspective view illustrating an electrode terminal of a rechargeable battery according to a first exemplary embodiment of the present invention.

FIG. 3 is a partial exploded perspective view illustrating an electrode terminal of a rechargeable battery according to a first exemplary embodiment of the present invention. FIG. 4 is a cross-sectional view illustrating an electrode terminal of the rechargeable battery taken along the line IV-IV of FIG. 1. FIG. 5 is a cross-sectional view illustrating an electrode terminal of the rechargeable battery taken along the line V-V of FIG. 1. FIGS. 3 to 5 illustrate only the positive terminal 60 according to the present exemplary embodiment. However, the negative terminal 70 may have a structure that is similar to that of the positive terminal 60. Accordingly, the positive terminal 60 will be described hereinafter, and portions of the negative terminal 70 that may differ from the positive terminal 60 will be briefly described.

Figure 4:
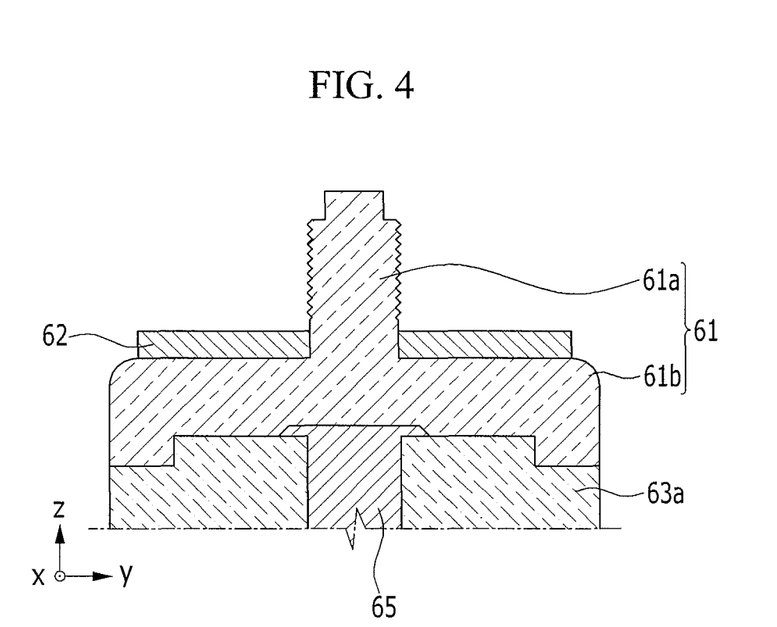
FIG. 4 is a cross-sectional view illustrating an electrode terminal of the rechargeable battery taken along the line IV-IV of FIG. 1.
Figure 5:
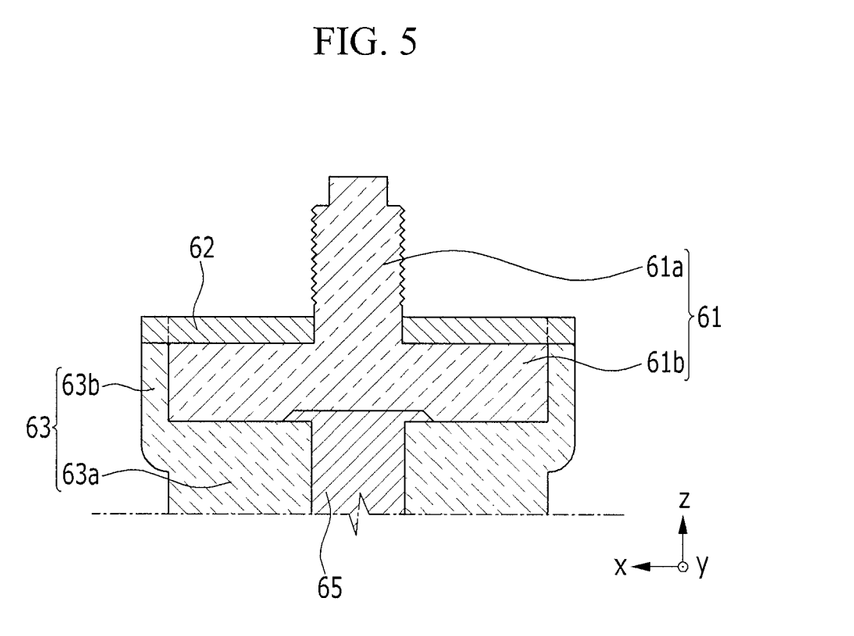
FIG. 5 is a cross-sectional view illustrating an electrode terminal of the rechargeable battery taken along the line V-V of FIG. 1.

Referring to FIGS. 3 to 5, the positive terminal 60 of the rechargeable battery 100 according to the present exemplary embodiment includes an upper terminal plate (i.e., second terminal plate) 62, a lower terminal plate (i.e., first terminal plate) 63, a positive terminal connection member 65, and a positive terminal fastener 61.

As described above, the positive terminal connection member 65 extends through a hole (e.g., through hole) in the cap plate 35 and the connection plate 64 to the outside of the cap assembly 30. The positive terminal connection member 65 is coupled, e.g., by having a rivet shape, to the lower terminal plate 63. The lower terminal plate 63 includes a pair of side walls 63b that are formed at both sides. The positive terminal fastener 61 is housed, i.e., is placed within, a space between the side walls 63b. The upper terminal plate 62 is coupled to the lower terminal plate 63, and thus, the positive terminal fastener 61 is between the upper terminal plate 62 and the lower terminal plate 63, fixing the positive terminal fastener 61 so that it does not move.

The lower terminal plate 63 of the positive terminal 60 includes a base plate 63a, a through hole in the base plate 63a, and a pair of side walls 63b that are opposite one another and are symmetrical with respect to the hole along a width direction (x-axis direction) of the cap plate 35. A portion of the positive terminal connection member 65 is in the through hole of the base plate 63a. The base plate 63a is coupled by the rivet shaped portion of the positive terminal connection member 65 to the positive terminal connection member 65, connecting the connection plate 64 to the base plate 63a and the positive terminal connection member 65. The pair of side walls 63b have a space therebetween, and the positive terminal fastener 61 sits in the space.

First groove portions are formed at two sides of the base plate 63a (the sides where the side walls 63b are not formed), and protrusions formed in the positive terminal fastener 61 are inserted into the first groove portions. Further, second groove portions are formed at the top of each side wall 63b, and edge portions of the upper terminal plate 62 are inserted into the second groove portions. By forming these groove portions, the positive terminal fastener 61, the upper terminal plate 62, and the lower terminal plate 63 may be easily assembled, and after they are assembled, rotation and movement of the positive terminal fastener 61 and the upper terminal plate 62 are suppressed.

The position and size of groove portions that are formed in the base plate 63a and the side walls 63b are not limited to the illustrated example, and can be variously changed.

The lower terminal plate (i.e., second terminal plate) 73 of the negative terminal 70 has a structure similar to the lower terminal plate (i.e., second terminal plate) 63 of the positive terminal 60. However, the short circuit tab 34 and the upper insulation member 55, instead of the connection plate 64, are installed between the lower terminal plate 73 and the cap plate 35. Additionally, as described above, holes are formed in each of the short circuit tab 34 and the upper insulation member 55. The negative terminal connection member 75 and the lower terminal plate 73 are coupled together by the rivet shaped portion (or any other suitable method and/or apparatus to couple the components) of the negative terminal connection member 75 extending through the through holes.

The positive terminal fastener 61 includes an insertion portion 61b that is housed (i.e., sits) in and/or on the lower terminal plate 63 and a fastening portion 61a that protrudes from one side of the insertion portion 61b. The insertion portion 61b has approximately the same width as a distance between the pair of side walls 63b of the lower terminal plate 63. The insertion portion 61b includes protrusions that are formed to correspond to the first groove portions of the base plate 63a of the lower terminal plate 63. Referring to FIG. 4, protrusions of the insertion portion 61b are inserted into the first groove portion of the base plate 63a of the lower terminal plate 63 to prevent the positive terminal fastener 61 from moving laterally, i.e., rotating in x-axis or y-axis directions.

The fastening portion 61a extends outwardly to the opposite side of the side that contacts the lower terminal plate 63. A thread is on the fastening portion 61a of the positive terminal fastener 61. When a plurality of rechargeable batteries 100 are formed into a battery module, neighboring rechargeable batteries are connected by a bus bar. By fastening and fixing the bus bar to the terminal fasteners of respective batteries, the electrode terminals 60 and 70 of neighboring rechargeable batteries may be stably connected.

In FIGS. 3-5, the upper terminal plate 62 is a flat plate, or at least the top surface of the upper terminal plate 62 is flat. A hole is in the upper terminal plate 62 so that the fastening portion 61a of the positive terminal fastener 61 may extend therethrough. The upper terminal plate 62 has protruding portions (e.g., edge portions) that protrude to opposite sides (both in the x-axis direction) of the upper terminal plate 62 and correspond to the second groove portions at the top of each side wall 63b of the lower terminal plate 63. Referring to FIGS. 4 and 5, the upper terminal plate 62 covers the insertion portion 61b of the positive terminal fastener 61 and then the protruding portion at both surfaces of the upper terminal plate 62 are welded to the second groove portion in each side wall 63b of the lower terminal plate 63 (e.g., by a laser). In this way, the upper terminal plate 62 and the lower terminal plate 63 are connected by welding a contact portion thereof and thus rotation and movement of the upper terminal plate 62 in x-axis and y-axis directions is suppressed. Accordingly, while the upper terminal plate 62 and the lower terminal plate 63 are electrically connected, the positive terminal fastener 61 that is housed in (or sits on) the lower terminal plate 63 is stably fixed.

In the present exemplary embodiment, the upper terminal plate 62 and the lower terminal plate 63 may be made of a material having high electrical conductivity such as aluminum or copper. The positive terminal fastener 61 may be made of a material having high strength, such as stainless steel.

Because stainless steel has lower electrical conductivity than aluminum or copper, current flowing through the electrode assembly 10, the lead tab 41, and the positive terminal connection member 65 generally does not flow through the positive terminal fastener 61, but instead, is transferred to the upper terminal plate 62 via the lower terminal plate 63.

Because stainless steel has relatively more strength than aluminum or copper, the risk of deformation or damage to a stainless steel fastening portion may be reduced even though a relatively large amount of torque is applied when connecting the bus bar to the positive terminal fastener 61 (using a bus bar fastening member such as a nut).

It is not easy to directly connect (i.e., through welding) the positive terminal fastener 61 that is made of a material having relatively high strength and relatively low conductivity (such as stainless steel) to components made of aluminum or copper, such as the lower terminal plate 63, the connection plate 64, the short circuit tab 34, or the cap plate 35. However, as described above, in the present exemplary embodiment, the positive terminal 60 includes an upper terminal plate (e.g., second terminal plate) 62 and a lower terminal plate (e.g., first terminal plate) 63, and by welding and securely connecting them with the positive terminal fastener 61 therebetween, the positive terminal fastener 61 may be fixed therebetween.

Figure 6:
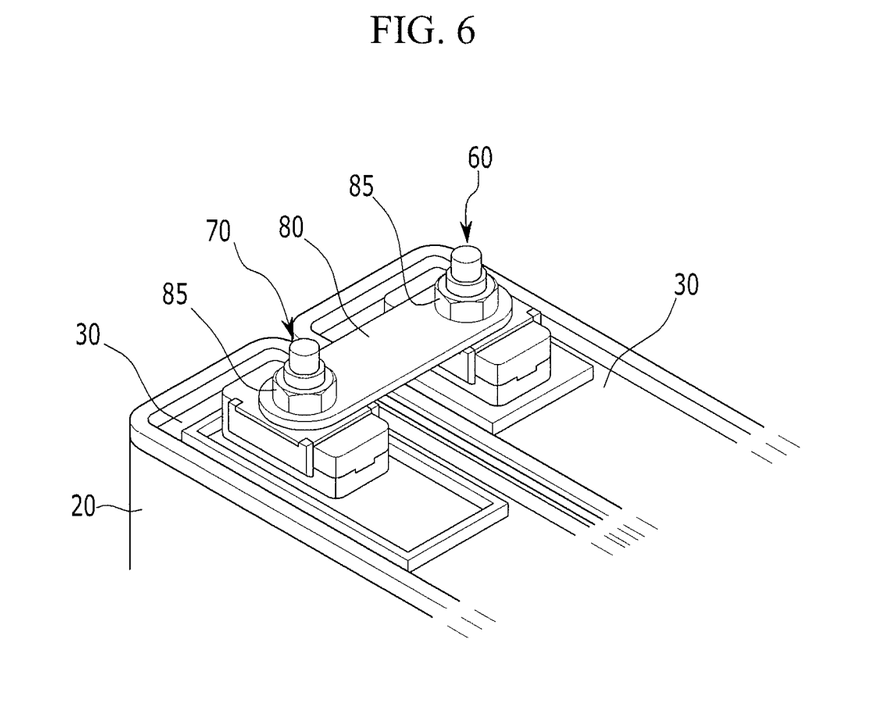
FIG. 6 is a partial enlarged view illustrating electrode terminals of adjacent rechargeable batteries fastened to a bus bar according to a first exemplary embodiment of the present invention.

FIG. 6 is a partial enlarged view illustrating a bus bar fixed to the electrode terminals of two adjacent rechargeable batteries according to a first exemplary embodiment of the present invention. Referring to FIG. 6, when forming a battery module by arranging rechargeable batteries in a line, a bus bar 80 is generally used to connect electrode terminals 60 and 70 of neighboring rechargeable batteries. The present exemplary embodiment illustrates electrode terminals 60 and 70 of two neighboring rechargeable batteries connected through a bus bar 80.

The bus bar 80 is formed in a bar shape, and has a pair of terminal holes into which fastening portions of terminal fasteners of the electrode terminals 60 and 70 are inserted. As shown in FIG. 6, after the positive terminal 60 and the negative terminal 70 of neighboring rechargeable batteries are inserted into the terminal holes of the bus bar 80, the positive terminal 60 and the negative terminal 70 are fastened through bus bar fastening members 85. Threads are present on the fastening portions of the terminal fasteners of the electrode terminals 60 and 70 according to the present exemplary embodiment. In order to fasten the bus bar 80 to the threads, the bus bar fastening member 85 is a nut having a matching thread in an inside surface thereof.

As described above, the terminal fasteners of the electrode terminals 60 and 70 are made of a material having high strength such as stainless steel, and thus when fastening the bus bar fastening member 85 to the terminal fastener, a large amount of torque can be applied. For example, if the terminal fastener were formed with aluminum, upon fastening the bus bar fastening member using a large amount of torque, the terminal fastener may be deformed or damaged due to the low strength of aluminum. However, when the terminal fastener is made of stainless steel, more than about double the amount of torque can be applied as compared to when the terminal fastener is made of a softer material, such as aluminum.

In this way, by forming the terminal fastener of the electrode terminals 60 and 70 according to the present exemplary embodiment with a material having high strength, such as stainless steel, when forming a battery module by connecting neighboring rechargeable batteries to the bus bar 80, a large amount of torque may be applied to the bus bar fastening member 85. Additionally, a terminal fastener made of a material different from that of a lower terminal plate and an upper terminal plate may be fixed between the lower terminal plate and the upper terminal plate, and an electrical passage may be formed between the lower and upper terminal plates, bypassing the terminal fastener. Accordingly, even when using a battery module in an environment in which vibration and an impact frequently occur, such as in an electric vehicle or a hybrid electric vehicle, the connection between rechargeable batteries is relatively secure, and the structure prevents or reduces the possibility that a battery will become unconnected from the module.

As the upper surface of the upper terminal plate 62 that functions as an electrical passage is flat, the contact area between the bus bar 80 and the electrode terminals 60 and 70 may be increased. Accordingly, contact resistance between the bus bar 80 and the electrode terminals 60 and 70 may be reduced, thereby reducing loss of electric energy.

Figure 7:
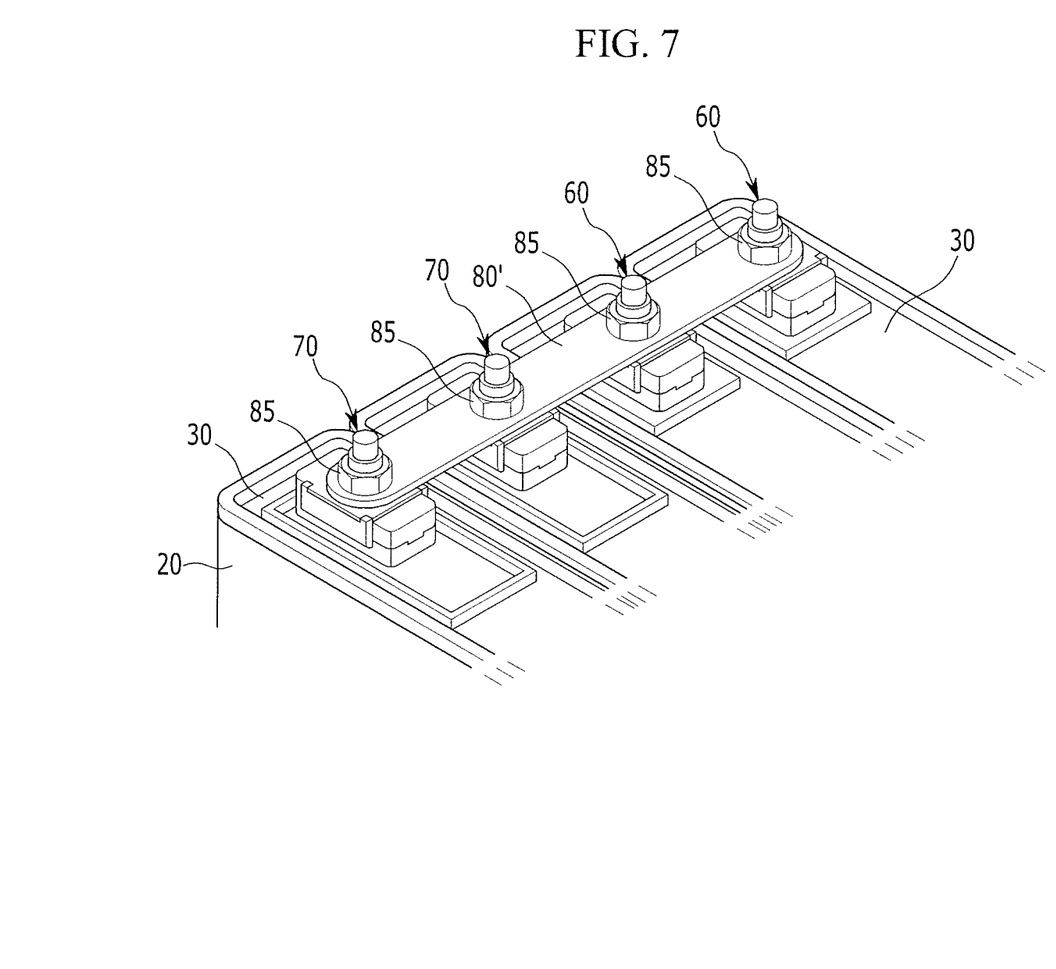
FIG. 7 is a partial enlarged view illustrating electrode terminals of adjacent batteries fastened to a bus bar according to an exemplary variation of the present invention.

FIG. 7 is a partial enlarged view illustrating a bus bar fixed to the electrode terminals of four adjacent rechargeable batteries according to an exemplary embodiment of the present invention. Referring to FIG. 7, when forming a battery module by arranging rechargeable batteries in a line, four rechargeable batteries may be connected using one bus bar 80'. That is, two rechargeable batteries are disposed so that neighboring electrode terminals have the same polarity, for example positive terminals 60, and another two rechargeable batteries are disposed so that neighboring electrode terminals have the same polarity, for example, negative terminals 70. The first two batteries are adjacent to the second two batteries such that the terminals of the first set of batteries and the second set of batteries that are adjacent to one another have different polarities. This way, four electrode terminals may be connected by one bus bar.

A configuration for connecting four or more electrode terminals using one bus bar with a method similar to the above may be used. When connecting rechargeable batteries with such a configuration, by connecting a plurality of rechargeable batteries by mixing a series connection and a parallel connection, a high capacity battery module can be formed.

Hereinafter, another exemplary embodiment of the present invention will be described. When describing this exemplary embodiment, descriptions of configurations and components that are the same as those previously described may be omitted.

Figure 8:
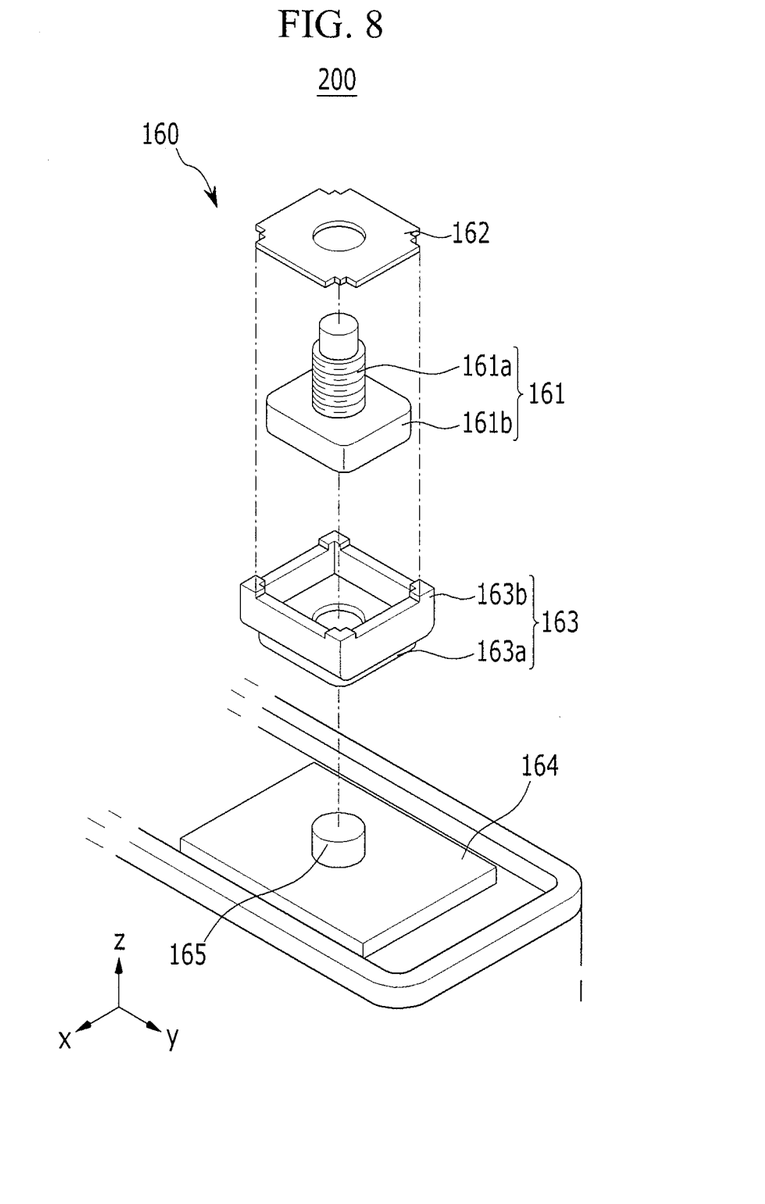
FIG. 8 is a partial exploded perspective view illustrating an electrode terminal of a rechargeable battery according to a second exemplary embodiment of the present invention.

FIG. 8 is a partial exploded perspective view illustrating an electrode terminal of a rechargeable battery according to a second exemplary embodiment of the present invention. FIG. 8 illustrates a positive terminal 160 according to the present exemplary embodiment, and a negative terminal could have a structure similar to the positive terminal 160 and thus a description of the negative terminal will be omitted.

In the present exemplary embodiment, other elements of a rechargeable battery 200 except for the electrode terminal are to the same as those of the first exemplary embodiment. That is, the rechargeable battery 200 of the present exemplary embodiment includes an electrode assembly including a positive electrode, a negative electrode, and a separator, a case that houses the electrode assembly, and a cap assembly including a cap plate that covers an opening of the case. However, in the present exemplary embodiment, the structure of an electrode terminal is different from that of the first exemplary embodiment.

Referring to FIG. 8, the positive terminal 160 according to the present exemplary embodiment includes an upper terminal plate (e.g., second terminal plate) 162, a lower terminal plate (e.g., first terminal plate) 163, a positive terminal connection member 165, and a positive terminal fastener 161. The positive terminal connection member 165 extends through holes in each of a cap plate and a connection plate 164 and protrudes to the outside of the cap assembly. The positive terminal connection member 165 is coupled, e.g., using a rivet shaped portion, to the lower terminal plate 163. The lower terminal plate 163 includes a base plate 163a and side walls 163b. The positive terminal fastener 161 has an insertion portion 161b. The insertion portion 161b of the positive terminal fastener 161 is housed, or sits, within a space that is enclosed by the side walls 163b.

The upper terminal plate 162 is coupled to the lower terminal plate 163 with the insertion portion 161b of the positive terminal fastener 161 therebetween. Groove portions are formed at the top of each of the side walls 163b of the lower terminal plate 163. Edge portions of the upper terminal plate 162 are inserted into and coupled to the groove portions. By performing laser welding where the edge portions are coupled with the groove portions, the upper terminal plate 162 and the lower terminal plate 163 are fixed. A fastening portion 161a of the positive terminal fastener 161 protrudes through the upper terminal plate 162 to a side opposite that which contacts the lower terminal plate 163.

In the present exemplary embodiment, the side walls 163b are formed along a periphery of the base plate 163a. Thus, the positive terminal fastener 161 is housed, or sits, inside the space formed by the side walls 163b, and the upper terminal plate 162 is coupled and fixed to the lower terminal plate 163. Accordingly, the positive terminal fastener 161 can be stably fixed without forming groove portions in the base plate 163a of the lower terminal plate 163.

Figure 9:
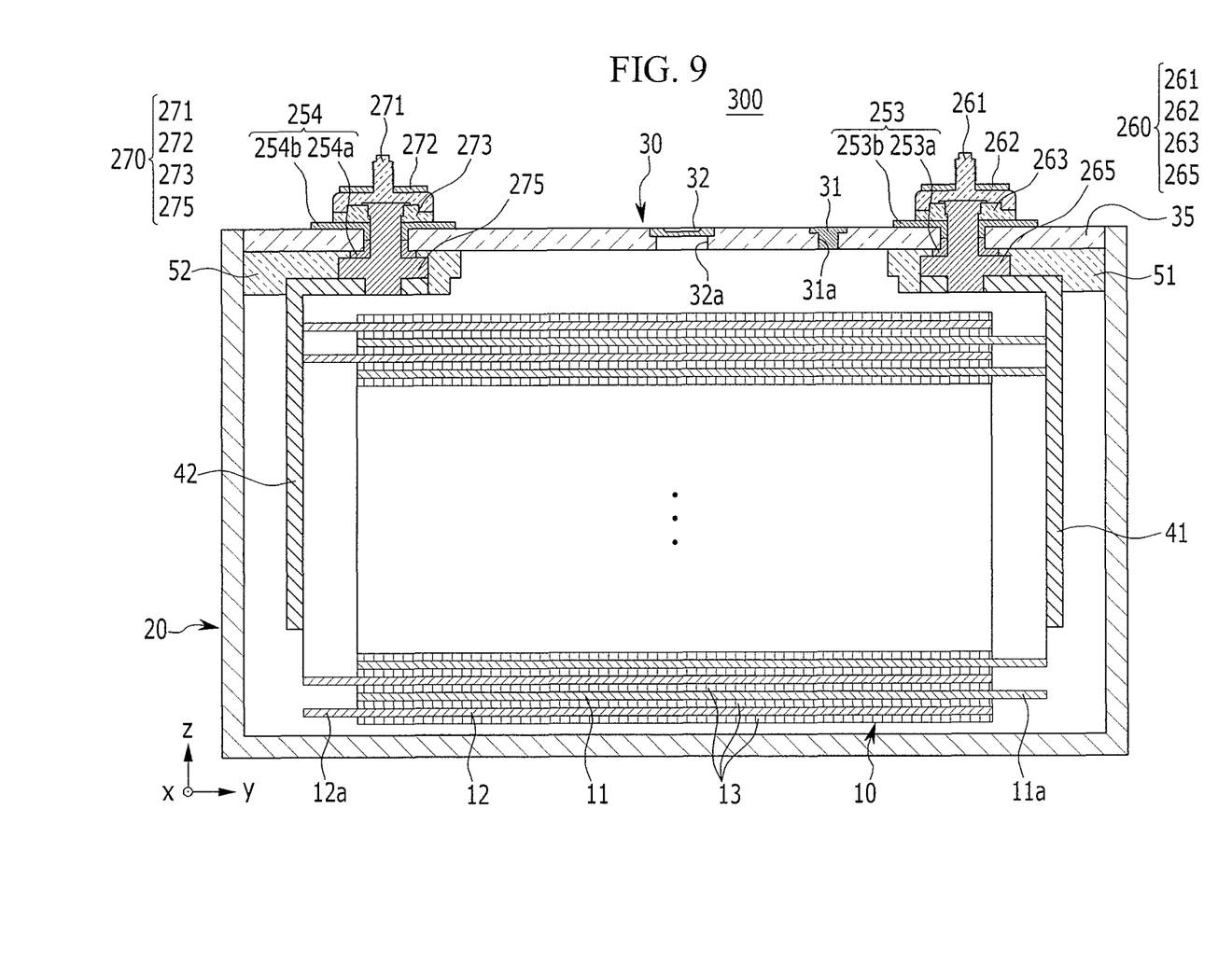
FIG. 9 is a cross-sectional view illustrating a rechargeable battery according to a third exemplary embodiment of the present invention.

FIG. 9 is a cross-sectional view illustrating a rechargeable battery according to a third exemplary embodiment of the present invention. Referring to FIG. 9, a rechargeable battery 300 according to the present exemplary embodiment has a similar structure to that of the rechargeable battery 100 according to the first exemplary embodiment. That is, the rechargeable battery 300 includes an electrode assembly 10 including a positive electrode 11, a negative electrode 12, and a separator 13; a case 20 that houses the electrode assembly 10; a cap assembly 30 including a cap plate 35 that covers an opening of the case 20; and electrode terminals 260 and 270 that extend through the cap plate 35. Further, the electrode terminals 260 and 270 include upper terminal plates (e.g., second terminal plates) 262 and 272, lower terminal plates (e.g., first terminal plates) 263 and 273, electrode terminal connection members 265 and 275, and electrode terminal fasteners 261 and 271, respectively.

In the cap assembly 30 of the present exemplary embodiment, a deformable plate, as in the first exemplary embodiment, is not included. Accordingly, a connection plate that electrically connects the positive terminal 260 to the cap plate 35 is not included and a short circuit tab and an upper insulation member are not included in the negative electrode terminal 270. In the present exemplary embodiment, gaskets 253 and 254 (including upper gaskets 253a and 254a and lower gaskets 253b and 254b) include an insulation material, thereby insulating the electrode terminal connection members 265 and 275 from the cap plate 35 and insulating the lower terminal plates 263 and 273 from the cap plate 35. As the deformable plate structure is omitted, a fastening force between neighboring connected electrode terminals can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF REFERENCE NUMBERS

| | |
|---|---|
| 100, 200, 300: rechargeable battery | |
| 10: electrode assembly | 11: positive electrode |
| 12: negative electrode | 13: separator |
| 20: case | 30: cap assembly |
| 31: seal stopper | 32: vent plate |
| 33: deformable plate | 34: short circuit tab |
| 35: cap plate | 41, 42: lead tab |
| 51, 52: lower insulation member | 53, 54, 253, 254: gasket |
| 55: upper insulation member | 60, 70, 160, 260, 270: electrode terminal |
| 61, 71, 161, 261, 271: terminal fastener | |
| 62, 72, 162, 262, 272: upper terminal plate (e.g., second terminal plate) | |
| 63, 73, 163, 263, 273: lower terminal plate (e.g., first terminal plate) | |
| 64, 164: connection plate | |
| 65, 75, 165, 265, 275: terminal connection member | |
| 80: bus bar | 85: bus bar fastening member |

What is claimed is:

1. A rechargeable battery comprising:
    a case;
    an electrode assembly in the case;
    a cap plate covering an opening of the case; and
    an electrode terminal comprising:
        a first terminal plate on the cap plate and electrically coupled to the electrode assembly;
        a second terminal plate electrically coupled to the electrode assembly via the first terminal plate, the second terminal plate having an opening therethrough;
        a terminal fastener located between the first and second terminal plates and comprising a fastening portion protruding through the opening in the second terminal plate, the terminal fastener comprising a first material different from a second material of the first and second terminal plates, the first material having a greater strength than the second material, wherein the terminal fastener is configured to be coupled to an external element; and
        a connection plate between the cap plate and the first terminal plate, the connection plate electrically coupling the first terminal plate to the electrode assembly.

2. The rechargeable battery of claim 1, wherein the first material comprises stainless steel and the second material comprises aluminum or copper.

3. The rechargeable battery of claim 1, wherein the first material has a lower electrical conductivity than the second material.

4. The rechargeable battery of claim 1, wherein the electrode terminal further comprises a terminal connection member extending from an inside of the case to an outside of the case through an opening in the cap plate, the terminal connection member electrically coupling the first terminal plate to the electrode assembly and fixing the first terminal plate to the cap plate.

5. The rechargeable battery of claim 4, wherein the terminal connection member protrudes through an opening in the connection plate and an opening in the first terminal plate, and wherein the connection plate electrically connects the first terminal plate to the cap plate.

6. The rechargeable battery of claim 4, further comprising a gasket between the first terminal plate and the cap plate to electrically isolate the first terminal plate from the cap plate.

7. The rechargeable battery of claim 1, wherein the first terminal plate comprises a base plate and at least two side walls protruding therefrom to hold the terminal fastener between the at least two side walls.

8. The rechargeable battery of claim 7, wherein the base plate has notches, and wherein the terminal fastener has protrusions to engage the notches.

9. The rechargeable battery of claim 7, wherein the at least two side walls comprise four side walls formed along a periphery of the base plate.

10. The rechargeable battery of claim 7, wherein each of the at least two side walls of the first terminal plate has a groove at an end distal from the base plate, and the second terminal plate comprises protrusions at sides for engaging the grooves.

11. The rechargeable battery of claim 10, wherein the second terminal plate is welded to the at least two side walls of the first terminal plate.

12. The rechargeable battery of claim 1, wherein the fastening portion of the terminal fastener is threaded.

13. The rechargeable battery of claim 1, wherein the electrode assembly comprises a first electrode, a second electrode, and a separator between the first and the second electrodes, and wherein the first electrode is electrically coupled to the cap plate, the rechargeable battery further comprising a second electrode terminal electrically coupled to the second electrode and electrically isolated from the cap plate.

14. The rechargeable battery of claim 1, wherein the rechargeable battery is configured as a power source for driving a motor of an electric vehicle.

* * * * *